(12) United States Patent
Nitta et al.

(10) Patent No.: US 7,379,289 B2
(45) Date of Patent: May 27, 2008

(54) CONDUCTIVE SEPARATOR AND ELECTROLYTIC CAPACITOR INCLUDING THE SAME

(75) Inventors: Yukihiro Nitta, Kyoto (JP); Hiroyuki Matsuura, Shiga (JP); Hiroki Kusayanagi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 281 days.

(21) Appl. No.: 10/549,119

(22) PCT Filed: Mar. 29, 2004

(86) PCT No.: PCT/JP2004/004408

§ 371 (c)(1),
(2), (4) Date: Sep. 14, 2005

(87) PCT Pub. No.: WO2004/088689

PCT Pub. Date: Oct. 14, 2004

(65) Prior Publication Data

US 2006/0176647 A1    Aug. 10, 2006

(30) Foreign Application Priority Data

Mar. 31, 2003    (JP)    ............................. 2003-094939

(51) Int. Cl.
*H01G 9/00*    (2006.01)
(52) U.S. Cl. ...................... 361/512; 361/516; 361/504; 361/523; 361/525; 361/508; 29/25.01; 29/25.03
(58) Field of Classification Search ........ 361/516–519, 361/528–534, 543, 502–504, 508–512, 523–525; 29/25.01, 25.03
See application file for complete search history.

(56) References Cited

U.S. PATENT DOCUMENTS

| 5,748,439 | A | * | 5/1998 | MacFarlane et al. | ........ 361/525 |
| 6,086,642 | A | * | 7/2000 | Fukaumi et al. | ........... 29/25.03 |
| 6,219,224 | B1 | * | 4/2001 | Honda | ........................ 361/537 |
| 6,287,630 | B1 | * | 9/2001 | Strange et al. | ................. 427/80 |
| 6,839,222 | B2 | * | 1/2005 | Takaoka et al. | ............. 361/512 |

FOREIGN PATENT DOCUMENTS

| JP | 64-90517 B2 | 4/1989 |
| JP | 7-249543 A | 9/1995 |
| JP | 7-283086 A | 10/1995 |
| JP | 11-186110 A | 7/1999 |
| JP | 2000-223364 A | 8/2000 |
| JP | 2001-155967 A | 6/2001 |

* cited by examiner

*Primary Examiner*—Nguyen T Ha
(74) *Attorney, Agent, or Firm*—McDermott Will & Emery LLP

(57) ABSTRACT

The present invention provides a highly conductive separator of which surface is coated with conductive polymer molecules, and provides an electrolytic capacitor having a low ESR characteristic using the separator. The conductive separator is formed by sticking the conductive polymer molecules to an insulating separator substrate by chemical oxidative polymerization, and the stuck amount of the conductive polymer molecules per basis weight of the separator substrate is set in the range of 3 to 30 g/m$^2$. Conductive polymer molecules that are hardly de-doped can be formed in the electrolyte for driving by chemical oxidative polymerization, so that an electrolytic capacitor having high capacitance and low ESR can be obtained.

10 Claims, 2 Drawing Sheets

CONDUCTIVE SEPARATOR AND ELECTROLYTIC CAPACITOR INCLUDING THE SAME

This application is the U.S. National Phase under § 35 U.S.C. § 371 of International Application No. PCT/JP2004/004408, filed Mar. 29, 2004, which in turn claims the benefit of Japanese Application No. 2003-094939, filed Mar. 31, 2003, the disclosures of which Applications are incorporated by reference herein in their entirety.

TECHNICAL FIELD

The present invention relates to a conductive separator employed in a winding electrolytic capacitor used in various electronic apparatuses, and to an electrolytic capacitor using the conductive separator.

BACKGROUND ART

A large capacity electrolytic capacitor having a low equivalent series resistance (hereinafter referred to as "ESR") in a high frequency region has been required in the area of electrolytic capacitors as electronic components in response to the frequency increase of electronic apparatuses.

Recently, for reducing ESR in the high frequency region, the solid electrolytic capacitor (hereinafter referred to as "SEC") employing solid electrolyte made of conductive polymer molecules or the like having high electric conductivity has been studied. For increasing the capacity, a SEC is commercialized that is formed by filling conductive polymer molecules into a winding capacitor element where a separator is disposed between anode foil and cathode foil and wound.

For preventing contact between anode foil and cathode foil, the winding SEC requires a separator to be disposed between anode foil and cathode foil. This separator is made of the following material:

carbonized paper produced by winding a capacitor element using so-called separator and then carbonizing the separator by heating or the like;

a material mainly containing non-woven fabric of glass fiber; or a material mainly containing non-woven fabric of synthetic fiber such as vinylon, polyester, or polyamide.

Here, the separator is made of Manila hemp or kraft paper that is used in a conventional electrolytic capacitor employing electrolyte for driving as the electrolyte.

As the polymer molecule employed in the solid electrolyte, the following materials are known:

poly-(3,4-ethylenedioxythiophene) (hereinafter referred to as "PEDT") produced by chemically oxidatively polymerizing 3,4-ethylenedioxythiophene (hereinafter referred to as "EDT") with ferric p-toluenesulfonate; and polypyrrole (hereinafter referred to as "PPY") produced by chemically oxidatively polymerizing pyrrole monomer with ferric chloride or persulfate.

While, a winding electrolytic capacitor employing both solid electrolyte made of conductive polymer molecule and electrolyte for driving as the cathode material is proposed.

In examples of the winding electrolytic capacitor, one of the group of separator paper such as Manila paper or kraft paper, porous film, and non-woven fabric separator of synthetic fiber is to be electric conductive with conductive polymer molecules that are chemically oxidatively polymerized with persulfate, and this electric conductive separator and electrolyte for driving are used. These examples are disclosed in Japanese Patent No. 2571941 and Japanese Patent Unexamined Publication No. H7-249543. An electrolytic capacitor where conductive polymer and electrolyte for driving are impregnated into a winding capacitor element is disclosed in Japanese Patent Unexamined Publication No. H11-186110.

In the winding SEC, however, a capacitor element is formed by winding anode foil having dielectric oxide film and etched cathode foil while disposing a separator between them, and the conductive polymer molecules forming the electrolyte are formed by dipping the capacitor element into solution for polymerizing and chemically oxidatively polymerizing it. As a result, as the size of the capacitor element is increased, solution for polymerization becomes less in the longitudinal central part of the capacitor element. Therefore, disadvantageously, the formed conductive polymer molecules become inhomogeneous, conductivity is decreased, and the ESR characteristic in a high frequency region is not improved.

For improving the impregnating ability of the solution for polymerizing into the capacitor element, it is effective to reduce the density of the separator.

When the Manila paper or kraft paper is used, however, the strength of the separator itself decreases to degrade short circuiting rate in winding.

Even when non-woven fabric of synthetic fiber capable of keeping the strength of the separator itself is used, basis weight decreases when the thickness of the non-woven fabric is made uniform and the density is decreased. Therefore, disadvantageously, the rate of occurrence of the short-circuit increases during aging in a manufacturing process of the capacitor, and the manufacturing rejection rate is extremely higher than that of the electrolytic capacitor using only the electrolyte for driving.

For improving the problems, an electrolytic capacitor employing both solid electrolyte made of conductive polymer molecules and electrolyte for driving as the cathode material is proposed. However, the electrolytic capacitor is composed of the conductive polymer molecules formed by performing chemical oxidative polymerization using persulfate such as sodium persulfate or ammonium persulfate, namely inorganic acid, as an oxidizing agent and dopant agent, so that the persulfate ions functioning as the dopant de-dope easily.

The persulfate ions are easily eluted into the electrolyte for driving, or the de-doping extremely reduces the conductivity of the conductive polymer molecules. Therefore, disadvantageously, thermal stability is low in the produced electrolytic capacitor, and the change over time of the ESR in the high frequency region is large.

The present invention addresses the conventional problems. The present invention provides a conductive separator that has high conductivity, is stable for the electrolyte for driving, and can realize an electrolytic capacitor having low ESR, and provides an electrolytic capacitor employing the conductive separator.

SUMMARY OF THE INVENTION

The present invention provides a conductive separator where conductive polymer molecules are stuck to an insulating separator substrate and the stuck amount of the conductive polymer molecules per basis weight of the separator substrate is set in the range of 3 to 30 g/m$^2$.

The present invention provides a conductive separator where conductive polymer molecules are stuck to an insulating separator substrate and the ratio of the basis weight of the conductive separator after sticking of the conductive polymer molecules to the basis weight of the separator substrate is set in the range of 1.1 to 2.5.

DETAILED DESCRIPTION OF PREFERRED EMBODIMENTS

Exemplary embodiments of the present invention will be described hereinafter with reference to the following drawings.

Figure 1:
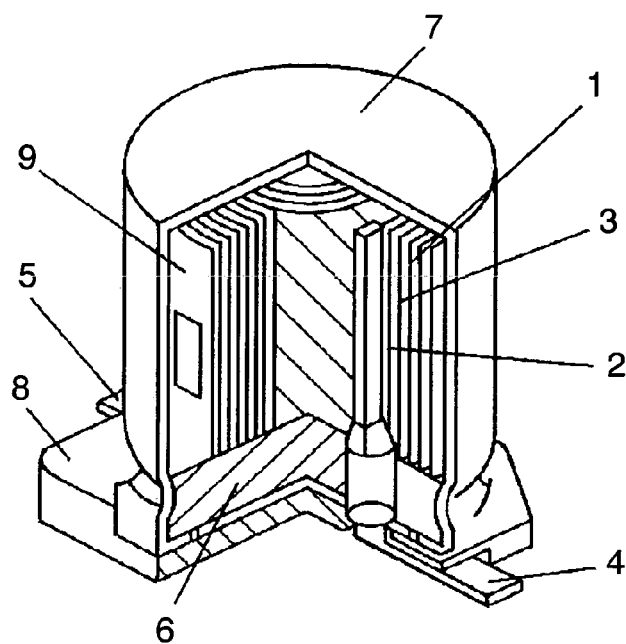
FIG. 1 is a fragmentary sectional perspective view showing a configuration of an electrolytic capacitor in accordance with an exemplary embodiment of the present invention.

In FIG. 1, capacitor element 9 includes the following elements:
- anode foil 1 formed of aluminum foil where the surface is roughened by etching and dielectric oxide film is then formed by anode oxidation;
- cathode foil 2 formed by at least etching aluminum foil; and
- conductive separator 3 formed by previously chemically oxidatively polymerizing curable monomer.

Capacitor element 9 is formed by winding anode foil 1 and cathode foil 2 with conductive separator 3 disposed between them. A surface mounting electrolytic capacitor is formed by the following processes:
- storing capacitor element 9 in closed-end cylindrical aluminum case 7;
- sealing an opening in aluminum case 7 with sealing material 6 through which anode lead 4 and cathode lead 5 are made to penetrate; and
- disposing insulating seat plate 8 on sealing material 6.

Here, the anode lead 4 and cathode lead 5 are guided to the outside from anode foil 1 and cathode foil 2, respectively. The electrolyte for driving may be impregnated into capacitor element 9 in the process before sealing. FIG. 1 shows the surface mounting electrolytic capacitor, but the present invention is not limited to the surface mounting type. An electrolytic capacitor having no insulating seat plate 8 is also allowed.

The conductivity of the conductive separator of the present invention is measured by a four-terminal method. The used measuring apparatus is Loresta (commercial name) manufactured by Mitsubishi Chemical Corporation. Next, specific exemplary embodiments of the present invention are described.

First Exemplary Embodiment

A separator substrate (thickness is 50 μm and basis weight is 22 g/m$^2$) made of mixed wet non-woven fabric is dipped into aqueous solution and pulled up. Here, this mixed wet non-woven fabric is mainly composed of polyethylene-terephthalate-based polyester fiber containing 3,5-dicarbomethoxybenzene sulfonic acid as copolymerized component and polyethylene-terephthalate-based polyester fiber containing diethylene glycol as copolymerized component. The aqueous solution contains pyrrole (concentration is 0.3 wt %), ammonium persulfate (concentration is 3 wt %), and 1-naphthalenesulfonate (concentration is 5 wt %) of organic acid compound. Thus, PPY as conductive polymer molecules is formed on the surface of the separator substrate by chemical oxidative polymerization using oxidation of ammonium persulfate. The separator substrate coated with the PPY is washed and then dried at 100° C. This operation is repeated over 1, 3, 5, 7, 10, 15, 20, 23, and 26 times to produce respective conductive separators.

Figure 3:
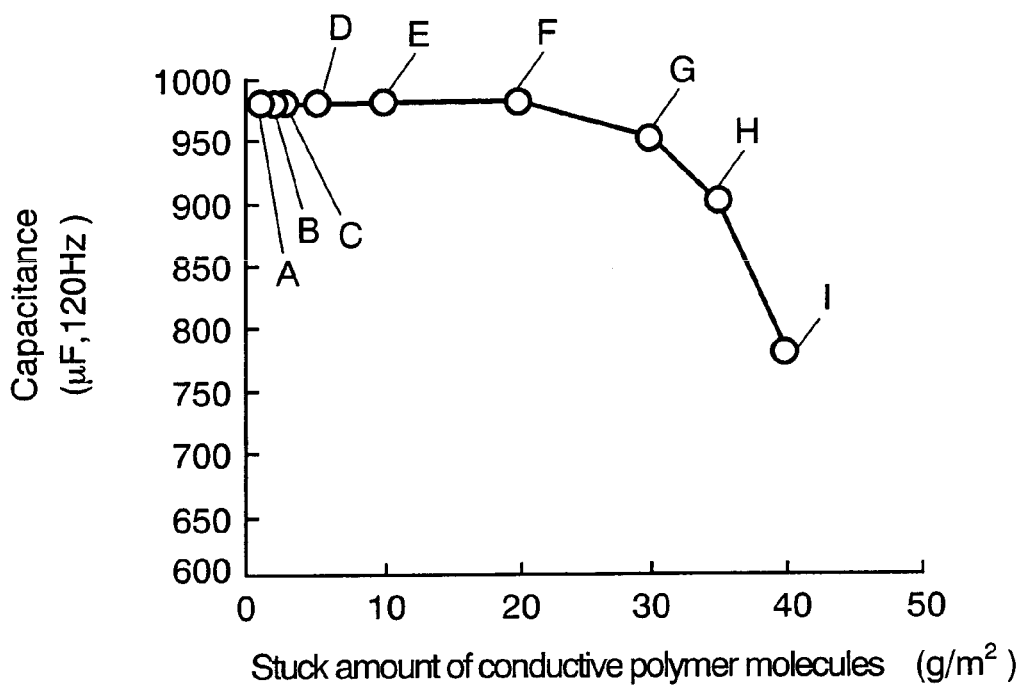
FIG. 3 is a diagram showing a relation between the stuck amount of conductive polymer molecules per basis weight of a separator substrate and capacitance.
Figure 4:
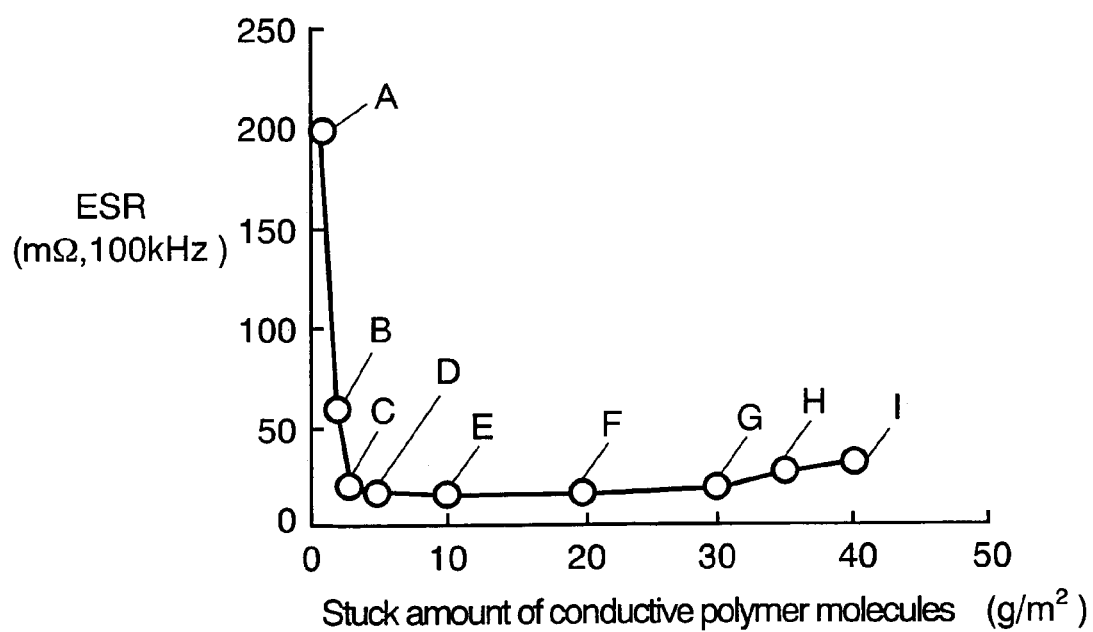
FIG. 4 is a diagram showing a relation between the stuck amount of conductive polymer molecules per basis weight of the separator substrate and ESR.

The respective numbers of times of repeating are hereinafter called A, B, C, D, E, F, G, H and I. The A to I in FIGS. 2, 3 and 4 show the numbers of times of repeating.

Based on the weight just after drying each conductive separator at 100° C. for 30 minutes and the basis weight derived from the measuring result of the area, the ratio of basis weight W2 of the conductive separator after sticking conductive polymer molecules and basis weight W1 of the separator substrate is determined. The ratio is shown in Table 1. Here, the ratio means a value derived by dividing W2 by W1, and is hereinafter called basis weight ratio.

Figure 2:
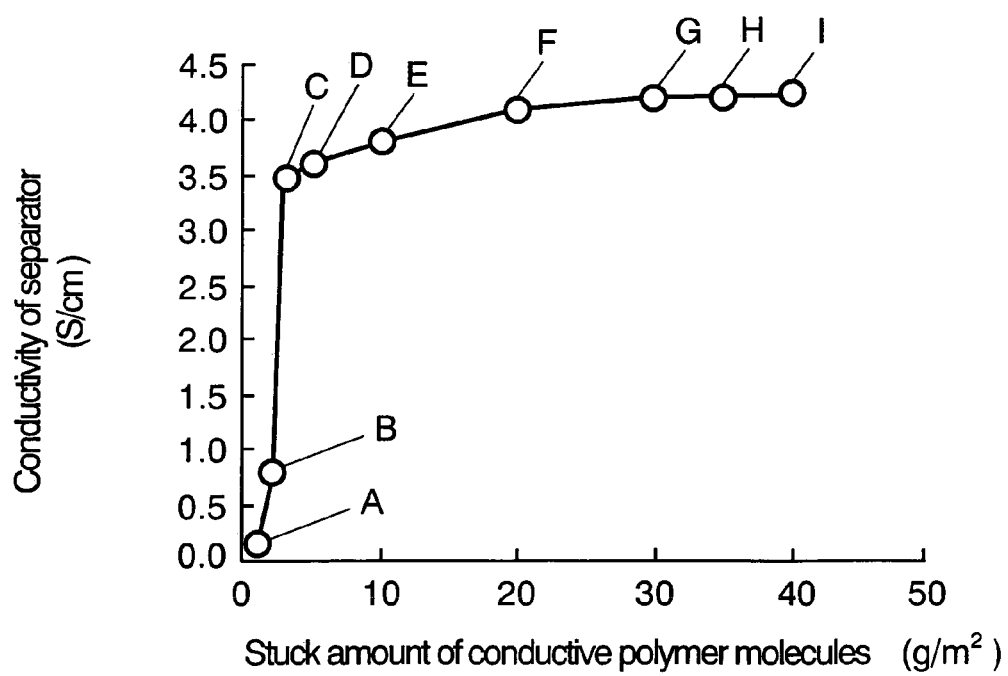
FIG. 2 is a diagram showing a relation between the stuck amount of conductive polymer molecules and conductivity of a separator.

FIG. 2 shows a relation between the stuck amount of conductive polymer molecules and the conductivity of a separator.

Next, each capacitor element is formed by winding an anode foil and a cathode foil with the conductive separator disposed between them. The anode foil is made of aluminum foil where the surface is roughened by etching and dielectric oxide film (forming voltage is 10V) is then formed by anode oxidation after roughening of. The cathode foil is formed by etching aluminum foil.

Then, the capacitor element is dipped into γ-butyrolactone solution (ion conductivity is 5 mS/cm, measuring temperature is 30° C.) under a decompression condition (gauge pressure is 60 mmHg), and electrolyte for driving is impregnated into a void of the capacitor element. Here, γ-butyrolactone solution contains mono (triethylamine)—phthalate (concentration is 25 wt %), p-nitro benzoic acid (concentration is 0.5 wt %), and monobutyl phosphoric ester (concentration is 0.5 wt %).

TABLE 1

| Time of treatments | Basis weight W1 of separator substrate (g/m$^2$) | Basis weight W2 after sticking conductive polymer molecules (g/m$^2$) | Stuck amount of conductive polymer molecules per basis weight of separator substrate (g/m$^2$) | Basis weight ratio W2/W1 | Conductivity of conductive separator (S/cm) |
|---|---|---|---|---|---|
| A | 22 | 23 | 1 | 1.05 | 0.15 |
| B | 22 | 24 | 2 | 1.09 | 0.81 |
| C | 22 | 25 | 3 | 1.14 | 3.5 |
| D | 22 | 27 | 5 | 1.23 | 3.6 |
| E | 22 | 32 | 10 | 1.46 | 3.8 |
| F | 22 | 42 | 20 | 1.91 | 4.1 |
| G | 22 | 52 | 30 | 2.36 | 4.2 |
| H | 22 | 57 | 35 | 2.59 | 4.2 |
| I | 22 | 62 | 40 | 2.82 | 4.2 |

Next, the capacitor element and resin vulcanized butyl rubber sealing material are inserted into the closed-end cylindrical aluminum case, and the opening in the aluminum case is sealed by curling. Here, this sealing material is composed of 30 part by weight of butyl rubber polymer, 20 part by weight of carbon, and 50 part by weight of inorganic filler, and sealing body hardness is 70 IRHD (international rubber hardness degree).

Then, respective lead terminals pulled out of the anode foil and the cathode foil are made to penetrate through an insulating seat plate made of polyphenylene-sulfide, and the lead parts are folded flat, thereby fixing the insulating seat plate.

Finally, direct-current voltage 6.3 V is applied continuously for one hour (at ambient temperature of 105° C.) to perform aging, and each surface mounting electrolytic capacitor (size: diameter 10 mm×height 10 mm) is produced.

FIG. 3 shows a relation between the stuck amount of conductive polymer molecules per basis weight of the separator substrate and the capacitance (measurement frequency is 120 Hz) in each electrolytic capacitor. FIG. 4 shows a relation between the stuck amount of conductive polymer molecules per basis weight of the separator substrate and the ESR (measurement frequency is 100 kHz) in each electrolytic capacitor. The number of prototyped electrolytic capacitors under each condition is 10, the capacitance and ESR are average values in 10 electrolytic capacitors. As shown in Table 1 and FIG. 2, in exemplary embodiment 1, a conductive separator having high conductivity of 1 S/cm or higher is formed by setting the stuck mount of conductive polymer molecules per basis weight of the separator substrate at 3 $g/m^2$ or more.

As shown in FIG. 2 and FIG. 3, until the stuck amount of the conductive polymer molecules becomes 20 $g/m^2$, the capacitance of the electrolytic capacitor can be kept high. When the stuck amount of the conductive polymer molecules exceeds 20 $g/m^2$, the conductivity of the conductive separator itself has a tendency to become saturated.

Especially when the stuck amount exceeds 30 $g/m^2$, clogging of the conductive separator by the conductive polymer molecules occurs excessively frequently. Therefore, impregnating ability of the electrolyte for driving extremely decreases, and the capacitance largely decreases.

As shown in FIG. 4, in the ESR characteristic of the electrolytic capacitor depending on the stuck amount of the conductive polymer molecules per basis weight of the separator substrate, the ESR in a high frequency region can be reduced by setting the stuck amount of the conductive polymer molecules at 3 $g/m^2$ or more (conductivity is 1 S/cm or higher). When the stuck amount of the conductive polymer molecules exceeds 30 $g/m^2$, the conductivity of the conductive separator increases, but the ESR slightly degrades.

In other words, by using the conductive separator where the stuck amount of the conductive polymer molecules per basis weight of the separator substrate is in the range of 3 to 30 $g/m^2$, the resistance between electrodes can be reduced, and influence of clogging of the conductive separator by the conductive polymer molecules can be avoided.

By using the conductive separator in an electrolytic capacitor, reduction of extracting factor of the capacitance or increase of the ESR that is caused by extreme reduction of impregnating ability of the electrolyte for driving is prevented. Therefore, an electrolytic capacitor having low ESR can be obtained.

Second Exemplary Embodiment

A conductive separator of exemplary embodiment 2 is produced similarly in exemplary embodiment 1 except the following material. As the separator substrate, non-woven fabric (thickness of the substrate is 50 μm and basis weight is 25 $g/m^2$) made of aromatic polyamide resin that mainly contains polyparaphenylene terephthalamide by a spun bond method is used.

The operation of dipping, washing, and drying is repeated over five times.

The conductivity of this conductive separator is 1.1 S/cm.

Basis weight determined based on the measuring results of the weight and area just after drying the conductive separator at 100° C. for 30 minutes is 31 $g/m^2$. This basis weight is equivalent to 3.5 $g/m^2$ of stuck amount of PPY of conductive polymer molecule. The basis weight ratio is 1.24.

An electrolytic capacitor is produced using this conductive separator similarly in exemplary embodiment 1.

Third Exemplary Embodiment

The separator substrate of exemplary embodiment 1 is dipped into aqueous solution and pulled up. The aqueous solution contains EDT (concentration is 0.3 wt %), sodium hypochlorite (concentration is 1 wt %), sodium persulfate (concentration is 3 wt %), 2-naphthalenesulfonate (concentration is 5 wt %) and p-nitrophenol (concentration is 0.1 wt %) of organic acid compound, and ethyl alcohol (concentration is 10 wt %). Thus, PEDT of conductive polymer molecule is formed on the separator substrate by chemical oxidative polymerization using oxidation of the sodium persulfate. The separator substrate coated with the PEDT is washed and dried at 100° C. This operation is repeated over five times to produce a conductive separator.

The conductivity of this conductive separator is 3.6 S/cm.

Basis weight determined based on the measuring results of the weight and area just after drying the conductive separator at 100° C. for 30 minutes is 30 $g/m^2$. This basis weight is equivalent to 3.3 $g/m^2$ of stuck amount of PPY of conductive polymer molecule. The basis weight ratio is 1.36.

An electrolytic capacitor is produced using this conductive separator similarly in exemplary embodiment 1.

First Comparative Example

A capacitor element is formed by winding anode foil and cathode foil with a separator substrate (thickness is 50 μm and basis weight is 25 $g/m^2$) disposed between them. The anode foil is made of aluminum foil where the surface is roughened by etching and dielectric oxide film (forming voltage is 10V) is then formed by anode oxidation. The cathode foil is formed by etching aluminum foil. The separator substrate is made of non-woven fabric that is formed of aromatic polyamide resin mainly containing polyparaphenylene terephthalamide by the spun bond method.

This capacitor element is dipped into solution and pulled up, and then left at 85° C. for 60 minutes. Here, the solution contains 1 part by weight of EDT of curable monomer, 2 part by weight of ferric p-toluenesulphonate of an oxidizing agent, and 4 part by weight of n-butanol of polymerization solvent. Thus, PEDT of conductive polymer molecule is formed between electrode foils by chemical oxidative polymerization.

Next, an electrolytic capacitor is produced using this capacitor element similarly in exemplary embodiment 1.

Table 2 shows comparing result of the electrolytic capacitors of exemplary embodiments 2 and 3 and comparative example 1 with respect to the following parameters:
capacitance (measurement frequency 120 Hz);
ESR (measurement frequency 100 kHz);
leak current (after 2 minutes since application of rated voltage 12 V);
the number of short-circuits (failures) during aging treatment; and
ESR and leak current after an application test (reliability test) of rated voltage 12 V in temperature atmosphere of 125° C. for 500 hours.

The number of samples is 50 for each example. The capacitance, ESR, leak current, and ESR and leak current after the application test of the rated voltage are shown as averages of the samples except short-circuiting electrolytic capacitors. As shown in Table 2, the electrolytic capacitors of exemplary embodiments 2 and 3 have high restoring property of the dielectric oxide film, because the surface of the separator substrate is coated with conductive polymer molecules formed by chemical oxidative polymerization and the electrolytic capacitors contain electrolyte for driving. Therefore, disadvantages such as increase of leak current due to withstand voltage shortage and short-circuit during aging are smaller comparing with the case of comparative example 1 where only conductive polymer molecules having low restoring property of the dielectric oxide film are employed. Thus, an electrolytic capacitor having high withstand voltage and high stability against current leakage or the like can be obtained.

TABLE 2

| | Electrical characteristics after aging (initial) | | | | Characteristics after reliability test | |
|---|---|---|---|---|---|---|
| | Capacitance (μF) | ESR (mΩ) | Leak current (μA) | Number of short-circuits during aging | ESR (mΩ) | Leak current (μA) |
| Exemplary embodiment 2 | 985 | 21 | <1 | 0 | 24 | <1 |
| Exemplary embodiment 3 | 990 | 19 | <1 | 0 | 21 | <1 |
| Comparative example 1 | 972 | 820 | 20 | 31 | 850 | 56 |

The conductive separator of the present invention is provided with conductivity by sticking conductive polymer molecules to an insulating separator substrate by chemical oxidative polymerization, and the stuck amount of the conductive polymer molecules per basis weight of the separator substrate is set in the range of 3 to 30 g/m$^2$. By setting the stuck amount of the conductive polymer molecules at 3.0 g/m$^2$ or more, a separator having high conductivity of 1 S/cm or higher is obtained, and conductive polymer molecules that are hardly de-doped can be formed in the electrolyte for driving by chemical oxidative polymerization. Therefore, an electrolytic capacitor having high capacitance and low ESR can be obtained.

When the stuck amount of the conductive polymer molecules is 3.0 g/m$^2$ or less, the conductivity of the conductive separator is low and the electrolytic capacitor can hardly have low ESR. When the stuck amount of the conductive polymer molecules exceeds 30 g/m$^2$, the conductivity of the conductive separator itself can be increased, but the clogging of the separator by the conductive polymer molecules occurs excessively frequently.

Therefore, the permeation of solution for polymerizing the polymer molecules extremely decreases, the impregnating ability of the electrolyte for driving extremely decreases, the extracting factor of the capacitance of the electrolytic capacitor decreases, and the ESR increases.

The conductive separator of the present invention is provided with conductivity by sticking conductive polymer molecules to an insulating separator substrate by chemical oxidative polymerization, and the basis weight ratio is set in the range of 1.1 to 2.5. By setting the basis weight ratio at 1.1 or higher, a conductive separator having high conductivity of 1 S/cm or higher can be obtained. Since conductive polymer molecules that are hardly de-doped into the electrolyte for driving can be formed by chemical oxidative polymerization, an electrolytic capacitor having high capacitance and low ESR can be obtained.

When the basis weight ratio is lower than 1.1, the conductivity of the separator is low and hence an electrolytic capacitor having low ESR cannot be obtained. When the basis weight ratio exceeds 2.5, the conductivity of the conductive separator itself can be increased, but the clogging of the separator by the conductive polymer molecules occurs excessively frequently. Therefore, the permeation of solution for polymerizing the polymer molecules extremely decreases, the impregnating ability of the electrolyte for driving extremely decreases, the extracting factor of the capacitance of the electrolytic capacitor decreases, and the ESR increases.

Conductive polymer molecules of the present invention are formed by chemically oxidatively polymerizing curable monomer in the solution containing at least a non-transition metal-based oxidizing agent and organic acid compound. In this composition, the conductive polymer molecules chemically oxidatively polymerized using the non-transition metal-based oxidizing agent do not contain transition metal ions apt to undergo oxidation-reduction reaction of iron or copper. Therefore, even when the conductive polymer molecules are used in an electrolytic capacitor and much water content infiltrates into the capacitor in high humidity atmosphere, degradation of leak current caused by dissolution-deposition of transition metal ions is prevented. Further, since the chemical oxidative polymerization is performed in the presence of the organic acid compound, organic acid component that is hardly de-doped and has high molecular weight can be doped into the conductive polymer molecules. Therefore, conductive polymer molecules having high heat resistance can be formed on the separator. As a result, even when much water content infiltrates into the capacitor in high humidity atmosphere, de-doping into the water content hardly occurs. Thus, an electrolytic capacitor that has high withstand voltage, high stability such as small leak current, stable ESR in a high frequency region, and high heat resistance can be obtained.

As the non-transition metal-based oxidizing agent, ammonium persulfate, potassium persulfate, sodium persulfate, hydrogen peroxide, or sodium hypochlorite is used. As the organic acid compound, benzenesulfonic acid, naphthalenesulfonic acid, toluenesulfonic acid, or nitrophenol is used.

As the curable monomer, pyrrole, thiophene, aniline, or their derivative can be used.

The separator substrate of the present invention is non-woven fabric containing at least one selected from the group of polyethylene terephthalate (PET), polybutylene terephthalate (PBT), polyphenylene sulfide (PPS), aliphatic polyamide, aromatic polyamide, polyimide, polyamideimide, polyetherimide, rayon, vitreous material. Thanks to this composition, bonding property and adhesion property between conductive polymer molecules of PPY and PEDT and a separator substrate made of the non-woven fabric can be extremely increased, and the ESR in the high frequency region can be decreased.

The separator substrate made of the above-mentioned non-woven fabric, differently from the non-woven fabric made of the other synthetic resin material, can be sheeted by a thermal bonding method or a mechanically confounding method without using an adhesive for bonding fibers together in sheeting. The melting point of the separator substrate is also high, so that heat shrinkage of resin hardly causes cutting of separator fiber or increase of the ESR even on the soldering condition exceeding 250° C. An electrolytic capacitor having high soldering heat resistance and low ESR can be obtained.

When the basis weight of the separator substrate is 10 g/m$^2$ or less, disadvantageously, separator cutting often occurs during the winding. When the basis weight is 60 g/m$^2$ or more, disadvantageously, the ESR in the high frequency region increases.

Since the separator substrate is dipped into the solution for polymerizing when the conductive polymer molecules are formed by chemical oxidative polymerization, confounding between fibers further occurs and hence the thickness of the separator after the polymerization often becomes longer than the initial thickness. Therefore, preferably, the thickness increment is previously considered and the initial thickness is 70 μm or shorter.

Non-woven fabric formed by mixing the separator substrate of the above-mentioned non-woven fabric and so-called cellulose fiber such as Manila hemp or kraft fiber may be employed. In this case, the content of the cellulose fiber is preferably 80% or lower. When the content of the cellulose fiber exceeds 80%, effects of the bonding property and adhesion property cannot be obtained sufficiently, and the ESR in the high frequency region degrades.

INDUSTRIAL APPLICABILITY

The conductive separator of the present invention has high conductivity of 1 S/cm or higher, and has extremely high bonding property and adhesion property of the conductive polymer molecules to the separator substrate. The reduction of the extracting factor of the capacitance and the increase of the ESR can be suppressed.

The conductive polymer molecules that are hardly de-doped can be formed in the electrolyte for driving by chemical oxidative polymerization.

As a result, an electrolytic capacitor having high capacitance and low ESR can be provided.

What is claimed is:

1. A conductive separator formed by sticking conductive polymer molecules to an insulating separator substrate,
   wherein a stuck amount of the conductive polymer molecules per basis weight of the separator substrate is in a range of 3 to 30 g/m$^2$.

2. The conductive separator according to claim 1,
   wherein conductive polymer molecules are formed by chemically oxidatively polymerizing curable monomer in the solution containing at least a non-transition metal-based oxidizing agent and organic acid compound.

3. The conductive separator according to claim 1,
   wherein the separator substrate is non-woven fabric containing at least one selected from the group of polyethylene terephthalate, polybutylene terephthalate, polyphenylene sulfide, polyamide, polyimide, polyamideimide, polyetherimide, rayon, and vitreous material.

4. An electrolytic capacitor using a capacitor element that is formed by winding anode foil having dielectric oxide film and etched cathode foil while disposing a conductive separator according to claim 1 between the anode foil and the cathode foil.

5. The electrolytic capacitor according to claim 4,
   wherein electrolyte for driving is impregnated into the capacitor element.

6. A conductive separator formed by sticking conductive polymer molecules to an insulating separator substrate,
   wherein a ratio of basis weight of the conductive separator after sticking of the conductive polymer molecules to basis weight of the separator substrate is in a range of 1.1 to 2.5.

7. The conductive separator according to claim 6,
   wherein conductive polymer molecules are formed by chemically oxidatively polymerizing curable monomer in the solution containing at least a non-transition metal-based oxidizing agent and organic acid compound.

8. The conductive separator according to claim 6,
   wherein the separator substrate is non-woven fabric containing at least one selected from the group of polyethylene terephthalate, polybutylene terephthalate, polyphenylene sulfide, polyamide, polyimide, polyamideimide, polyetherimide, rayon, and vitreous material.

9. An electrolytic capacitor using a capacitor element that is formed by winding anode foil having dielectric oxide film and etched cathode foil while disposing a conductive separator according to claim 6 between the anode foil and the cathode foil.

10. The electrolytic capacitor according to claim 9,
    wherein electrolyte for driving is impregnated into the capacitor element.

* * * * *